Figure 1:
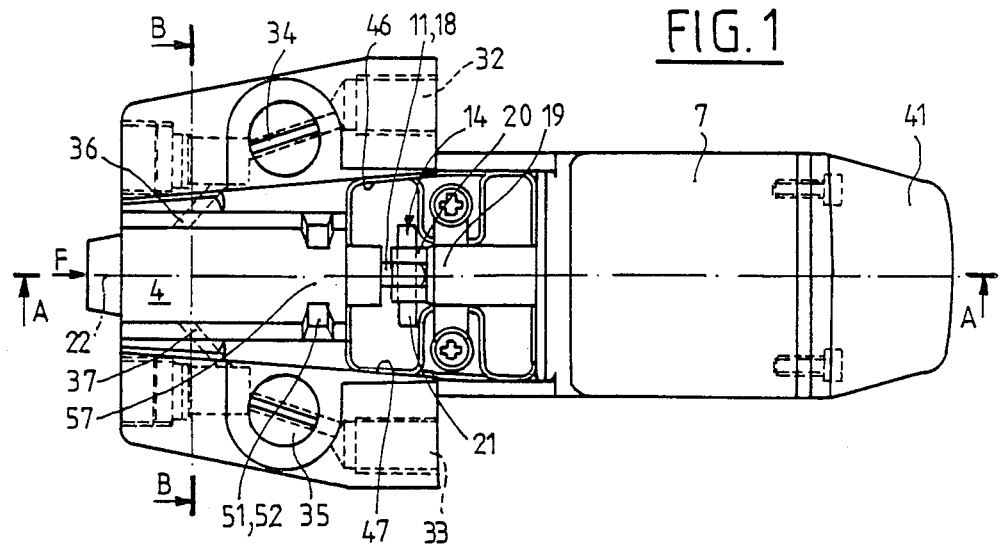

United States Patent [19]

Carrillon

[11] Patent Number: 4,860,925
[45] Date of Patent: Aug. 29, 1989

[54] DEVICE FOR MIXING FLUIDS, NOTABLY LIQUIDS, AND DISPENSING THE MIXTURE THUS OBTAINED, AND APPARATUS INCORPORATING THIS DEVICE

[75] Inventor: Henri Carrillon, Villeurbanne, France

[73] Assignee: Comptoir General d'Emballage, Villeurbanne, France

[21] Appl. No.: 149,918

[22] Filed: Jan. 25, 1988

[30] Foreign Application Priority Data

Jan. 30, 1987 [FR] France ............................. 87 01117

[51] Int. Cl.$^4$ ............................................. B67D 5/60
[52] U.S. Cl. ..................................... 222/145; 222/148
[58] Field of Search ............. 222/129, 134, 136, 145, 222/148, 531, 534, 536, 556; 239/104, 106, 112, 115–116, 412, 414; 74/110

[56] References Cited

U.S. PATENT DOCUMENTS

| 3,784,110 | 1/1974 | Brooks | 239/304 |
| 4,155,508 | 5/1979 | Fiorentini | 239/118 |
| 4,568,003 | 2/1986 | Sperry et al. | 222/145 |
| 4,708,292 | 11/1987 | Gammons | 239/414 |

FOREIGN PATENT DOCUMENTS 8606654  11/1986  PCT Int'l Appl. ................ 222/149

Primary Examiner—Michael S. Huppert
Attorney, Agent, or Firm—Mason, Fenwick & Lawrence

[57] ABSTRACT

A fluid dispensing device for mixing fluids, particularly, liquids, and dispensing the mixture thus obtained, comprises an adjustment mechanism associated with a control device so as to be movable with, but not readily disconnectable from, the control device. The adjustment mechanism is independent of a main support of the fluid dispensing device so that the adjustment mechanism can be moved with a mixing chamber in relation to the main support, thus permitting the disengagement of supply conduits and the cleaning thereof without disconnecting the adjustment mechanism from the control device.

23 Claims, 2 Drawing Sheets

DEVICE FOR MIXING FLUIDS, NOTABLY LIQUIDS, AND DISPENSING THE MIXTURE THUS OBTAINED, AND APPARATUS INCORPORATING THIS DEVICE

BACKGROUND OF THE INVENTION

1. Field of the Invention

This invention relates to a device for mixing fluids, notably liquids, and dispensing the mixture thus obtained. This invention is applicable advantageously to the mixing and dispensing of a mixture of liquid products liable to react chemically, such as polyols or liquid organic resins with isocyanates to yield polyurethane foams utilized notably for packaging purposes.

2. The Prior Art

The essential difficulty encountered with all hitherto known devices of this kind is due to the fact that, when the mixed fluids react rapidly and strongly, or are each liable to dry or harden, these devices are eventually stopped. Therefore, it is necessary to have the possibility of clearing the feed passages, the mixing chamber, the dispensing nozzle, and all the other component elements of the device that are in contact with at least one of the fluid implemented.

Many devices have already been proposed for dispensing polyurethane foam and solving the above-mentioned problem.

Thus, a device of this character is disclosed in the US-A-4 023 733 and 3 263 928, and in the FR-A-2 122 920, wherein the mixing chamber comprises a Teflon core forming a mixing bore wherein an adjustment rod is adapted to slide for closing or opening fluid inlet conduits opening into said bore. As this solution did not prove to be satisfactory per se, other additional or complementary arrangements have been proposed to avoid the unpleasant stopping or clogging effects. Thus, it is known that it is advantageous to off set longitudinally the conduits delivering the products to be mixed, to provide a solvent-filled tank at the rear of the mixing chamber, or to inject solvent or compressed air though the conduits and/or through the mixing chamber.

On the other hand, it is obvious and known that it is advantageous to have the possibility of disassembling the device, notably the mixing chamber (with or without the adjustment rod) so that this chamber can be replaced and/or cleaned when it is too much stopped (U.S. Pat. Nos. 3,263,928, 3,417,923, 3,784,110, 3,224,642, 3,291,396 and 4,469,251, and French Patent No. 2,511,889).

However, the known devices wherein the mixing chamber can be replaced are not satisfactory in actual practice for the following reasons:

when the rod is rigidly connected to the device, the chamber cannot be removed unless the rod is extracted from the support and inserted into a new chamber, an operation that can hardly be performed without damaging the new core and the rod-guiding sliding-contact bearings;

the hitherto known forms of embodiments of the releasable coupling of the mixing chamber and/or the rod with the support consisting of the device and/or the rod control means do not provide a sufficiently accurate and well-centered coupling with said support and/or the control means, thus leading to premature wear and tear of the rod and core, and damaging the connection of the fluid supply conduits of the support with those of the mixing chamber;

the hitherto known means proposed for detachably connecting the mixing chamber with the support are not strong enough and thus tend to break up before the device is fully clogged and before the mixing chamber is replaced or cleaned, so that accidents and/or a complete failure of the device or of its essential and most expensive component elements are most likely to take place;

mixing chambers, and more particularly the rods sliding in the core, are very expensive items and must be machined with a high degree of precision. Therefore, it is undesirable to provide systematically several sets of mixing chambers and/or rods;

assembling and replacement handlings are both time-robbing and tedious, thus impairing productivity, and may cause shocks, falls or stain of the mixing chamber.

When a rod detachable from the control means provided for replacing the mixing chamber, the actuation of the device when the adjustment rod is not properly associated with said control means may cause accidents or damage essential and expensive component elements of the device.

On the other hand, the Applicant found that in actual practice the clogging of the bore of the mixing chamber is a very seldom occurrence, for in the closed position, the rod clears any products left therein, and that stopping problems occur mostly only in the conduits supplying the fluid products to the support and to the mixing chamber.

Under these conditions, according to a specific feature of the present invention, and in contrast to the teachings of the prior art, it is not desirable to have the possibility of removing the mixing chamber and more particularly the means for adjusting the control means and the support, except under very exceptional circumstances, for instance when the mixing chamber is clogged completely with the products.

SUMMARY OF THE INVENTION

Therefore, it is the primary object of the present invention to provide a device of the type broadly disclosed hereinabove but characterized by a considerably improved reliability in comparison with prior art devices, the device of the present invention becoming clogged or stopped only very seldom and after a long useful life, and being adapted to be maintained easily and without any risk.

More particularly, the essential objects of the present invention consist in avoiding the inconveniences of prior art devices by:

permitting the easy and quick cleaning of the fluid lead-in conduits of the support and mixing chamber while avoiding and preventing any uncoupling of the adjustment rod from its control means, providing a device of which the operation and maintenance are considerably more economical than those of the prior art, permitting a quick, easy and accurate reassembling of the mixing chamber on the support, since the conduits supplying the fluids to the support are caused to register accurately and automatically with those of the mixing chamber, and the mixing chamber is positioned with the desired and necessary precision with respect to the adjustment means, warranting a rigid yet detachable assembling of the mixing chamber on the support which is more reliable and stronger than those of the prior art, in particular which is capable of withstanding the stress even when the mixing chamber is clogged completely, providing a device definitely safe in actual service and during its maintenance while complying with the most coercitive safety regulations.

For this purpose, according to a first essential feature of the present invention, there is provided a device for mixing fluids, notably liquid products, and dispensing the mixture thus obtained, this device comprising support means, a mixing chamber rigidly yet releasably connected to said support means, movable adjustment means in said mixing chamber for adjusting from inside the output of the fluids introduced into the mixing chamber and adapted notably to close or open the input conduits delivering the fluids into the mixing chamber, and means for controlling said adjustment means, said control means being rigidly mounted integral with said support means, wherein said adjustment means are connected to said control means in such a manner as to be movable in relation to, but not readily disconnectable from, said control means, said adjustment being on the other hand independent of said support means, whereby said adjustment means can be moved with said mixing chamber with respect to said support means, thus permitting notably of releasing and cleaning said inlet conduits without disconnecting said adjustment means with respect to said control means.

Preferably, the device comprises two separate rods, i.e. an adjustment rod slidably fitted in an inner mixing bore of the mixing chamber and guided during its axial sliding movements by said mixing chamber bore for adjusting the fluid output, and a control rod coupled with said control means and adapted to slide in relation to said support means and guided during its sliding movements by said support means for controlling said adjustment rod, and said adjustment and control rods are movably interconnected but not readily disconnectable from each other.

The means for adjusting the control means consist of joints and the mixing chamber is associated with an external free surface of said support means so that it can be moved substantially at right angles to said free surface when it is disconnected from said support means.

According to a second essential feature of the present invention, there is provided a device for mixing fluids, notably liquids, and dispensing the resulting mixture, said device comprising support means, a mixing chamber rigidly yet releasably connected to said support means, at least one rigid adjustment member adapted to slide axially in said mixing chamber for adjusting the amounts of fluids delivered into said mixing chamber, notably by closing or opening the conduits delivering said fluids into said mixing chamber, this device being characterized in that said means for rigidly and detachably connecting said mixing chamber to said support means comprise specific means for axially aligning and/or wedging said mixing chamber in relation to said support means, whereby said mixing chamber, when coupled to said support means, is and remains in a predetermined, accurately defined position in alignment with respect to the axis of the sliding movement of said adjustment member, and/or locked without allowing any axial play whatsoever.

The specific means for axially aligning and locking said mixing chamber may consist of respective and complementary configurations given to the outer surface of the mixing chamber which contacts said support means and to the surface of said support means constituting a recess for receiving said mixing chamber and closely contacting the outer surface of said chamber. Said alignment and locking means may consist for instance of at least one projection engaging at least one groove or like recess.

Said movable adjustment means are guided during their movements in said mixing chamber by guide means rigidly connected to, and incorporated in, said mixing chamber, while excluding any other guide means with respect to said support means and/or said control means.

This invention is also directed to provide an improved apparatus for dispensing foam, notably polyurethane foam, of the type utilized for instance in the packing industry or in other applications, notably an apparatus to be held by hand, which is characterized in that it incorporates the mixing device of the present invention.

Other features and advantages of the invention will appear as the following description proceeds with reference to the accompanying drawings illustrating diagrammatically by way of example a typical form of embodiment of the invention.

THE DRAWINGS

Figure 2:
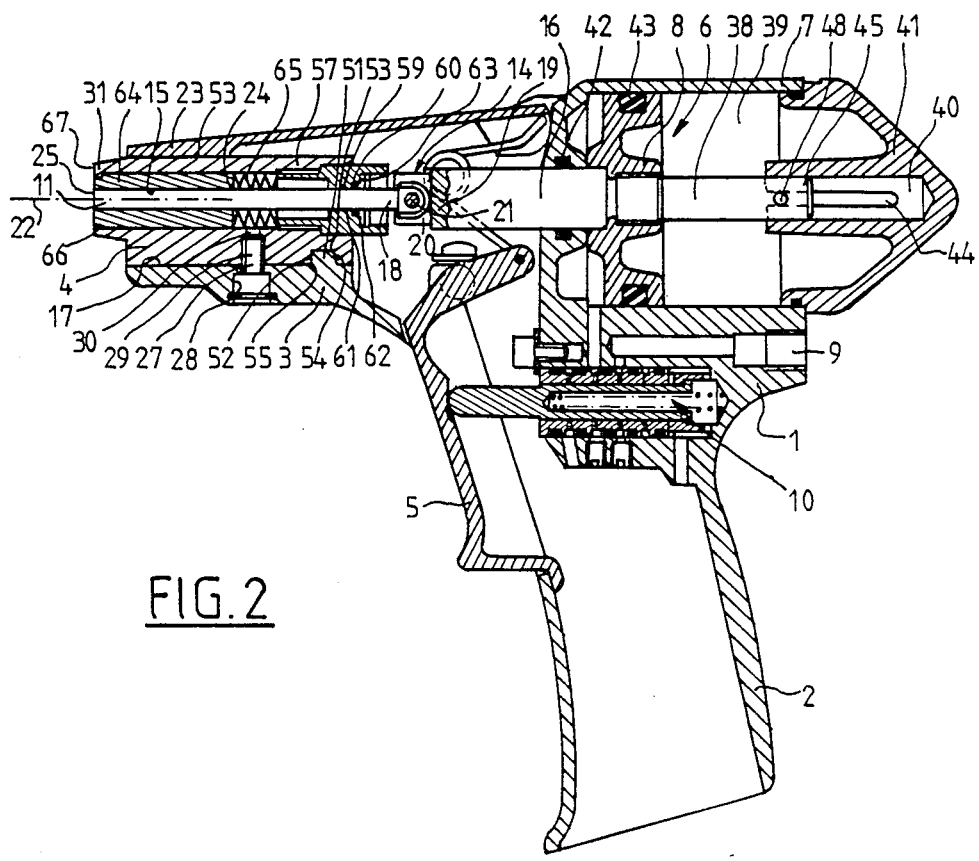
Figure 3:
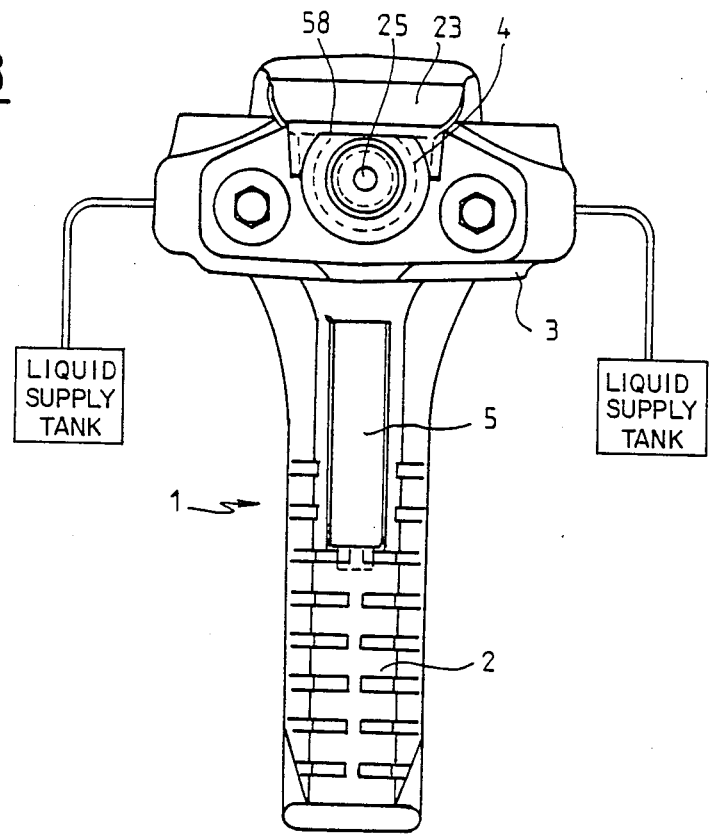
Figure 4:
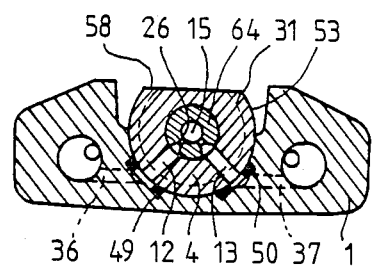

FIG. 1 is a plan view from above showing the device according to the present invention, from which the top cover has been removed for the sake of clarity, FIG. 2 is a vertical section taken along the line A—A of FIG. 1, FIG. 3 is a front elevational view of the device as seen in the direction of the arrow F of FIG. 1, and FIG. 4 is a cross-section taken along the line B—B of FIG. 1.

The drawings illustrate a preferred form of embodiment of the invention and shows a fluid mixing and dispensing device in the form of a hand tool, notably for liquids, this device comprising a support or body 1 having substantially the appearance of a handgun so that is can be easily handled. This support 1 comprises a lower portion or grip 2 and a projecting front portion 3, of substantially barrel configuration, supporting a mixing chamber 4. The device further comprises a finger-controlled actuator 5, notably in the form of a trigger, for actuating control means 6 disposed at the rear upper end 7 of support 1.

The actuating means 5 and the control means 6 are of a type already known per se, notably through the U.S. Pat. Nos. 4,023,733, 4,469,251 and 3,263,928, and therefore a detailed description thereof is unnecessary for a proper understanding of the invention. The control means 6 advantageously consists of a double-acting pneumatic clyinder comprising a piston 8 and supplied with compressed air through a rear inlet port 9, the actuator 5 comprising valve means controlling the movements of piston 8 in one or the other direction.

According to the instant invention, this manual device is incorporated in a polyurethane foam dispensing apparatus for packaging applications, this apparatus further comprising separate tanks for the fluids, and means for delivering fluids under pressure to the device.

Though the present invention is intended preferably for a manual apparatus of the above-described type, it is also applicable to an automatic apparatus such as the apparatus disclosed in the U.S. Pat. No. 4,196,160. In this case, the device of the present invention will be incorporated in this automatic apparatus but the support 1 and actuator 5 will be adapted thereto at the cost of adequate transformations.

In the various Figures of the drawings, the device is shown in its ready-for-use condition, but before its actuation. In FIG. 1, the top protection cover normally covering the mixing chamber, the control means 6 and the adjustment means 11, has been removed for the sake of clarity.

According to a preliminary feature of the present invention, a device for mixing fluids, notably liquids, and dispensing the mixture thus obtained, which comprises a support 1, a mixing chamber 4 rigidly yet releasably connected to said support 1, movable adjustment means 11 disposed in the mixing chamber 4 for adjusting the quantity of fluids introduced into said chamber 4 - notably by closing or opening more or less the conduits 12, 13 through which the fluids are introduced into said mixing chamber 4, and means 6 rigidly mounted integral with said support 1 for controlling the adjustment means 11, is characterized in that said adjustment means 11 are connected to said control means 6 so as to be movable with, but not immediately disconnectable from, said control means 6, said adjustment means 11 being on the other hand independent of said support 1 so that said adjustment means 11 can be moved bodily with the mixing chamber 4 with respect to said support 1, thus permitting of removing and cleaning the inlet conduits 12, 13 without disconnecting the adjustment means 11 from the control means 6.

The terms "not immediately disconnectable" mean that the adjustment means 11, though so mounted as to be movable with respect to control means 6, cannot be disconnected by simply removing the mixing chamber 4 from the support 1, unless at least another element of said support 1 and/or said control means 6 is subsequently removed, or one part of the device, for example the means 14 coupling the adjustment means 11 with the control means 6, is damaged.

Preferably, a device constructed according to the teachings of the present invention comprises a pair of separate rods 11, 16, namely a first adjustment rod 11 adapted to slide in an inner mixing bore 15 of mixing chamber 4 and guided for sliding movement by said mixing chamber 4 for constituting said means for adjusting the fluid imputs, and a control rod 16 coupled to said control means 6 and adapted to slide with respect to the support 1 and guided during its sliding movements by said support for controlling the adjustment rod 11, the two rods 11, 16 being operatively interconnected so as to be movable in relation to, but not readily disconnectable from, each other. The means for movably coupling the adjustment means 11 to the control means 6 are of the joint type and the mixing chamber 4 is associated with a free external surface 17 of support 1, so that the chamber 4 can be moved in a direction substantially perpendicular to said free surface 17 when the chamber 4 is disconnected from its support 1. In the preferred form of embodiment illustrated, the adjustment and control rods 11, 16 are pivotally interconnected at their free ends 18, 19, respectively, notably by means of a universal joint 14 comprising a yoke 20 and a cross-pin 21, or otherwise. The rods 11, 16 are substantially aligned with each other along an axis 22 when the mixing chamber 4 is coupled to support 1 and when said rods 11, 16 are operating. It will be seen that in contrast to the prior art, the joint or like means 14 interconnecting the rods 11, 16 compensate notably any faulty alignment between the two rods 11, 16, notably due to faulty alignments between the mixing chamber 4 and the axis 22 of the sliding movement of translation of control rod 16 rigidly coupled to piston 8. Thus, the useful life of mixing chamber 4 and adjustment rod 11 is increased appreciably. The common axis 22 is also the axis of the sliding movements of rods 11, 16 during their movements of translation when the actuator or trigger 5 is depressed.

The adjustment rod 11 penetrates into the mixing bore 15 at the end 24 of this bore 15 which is opposite the end 25 constituting the mixture dispensing nozzle thus obtained, and the inlet conduits 12, 13 open into the inner surface 26 of mixing bore 15 (FIG. 4).

The mixing chamber 4 is disposed flat on a free external surface 17 of the front portion 3 of support 1 and rigidly yet detachably connected to this support 1 via a screw 27 engaging from beneath a bore 28 of support 1 which extends at right angles to the axis 22, said screw 27 being forcefitted in this bore 28. The threaded shank 29 of screw 27 projects upwards from the free external surface 17 and engage corresponding threads 30 formed in the body 31 of mixing chamber 4.

The hoses (not shown) supplying the fluids to the device may be connected to inlet ports 32, 33 disposed on either side of support 1 and supplying via valve means 34, 35 of a type known per se (for example from the French Patent No. 2,511,889) the supply conduits 36, 37 of support 1, leading to the inlet conduit 12, 13 of mixing chamber 4 (FIG. 4) and opening into the mixing bore 15.

The control rod 16 is rigidly coupled to, and adapted to move with, the piston 8, for example by using circlip and groove means. This rod 16 extends through the rear portion of piston 8 and comprises an extension 38 opposite its free end 16 coupled to the adjustment rod 11. This extension 38 extends through the chamber 39 of control cylinder and slidably engages a rear bore 40 formed in the rear housing 41 of support 1. This rear bore 40 is parallel to the axis 22 of the mixing chamber and adapted to guide, by means of a sliding contact bearing 42 of support 1, engaged by control rod 16, and of another sliding contact bearing 43 for piston 8 formed on the walls of chamber 39, the assembly comprising said control rod 16 and said piston 8 during its movements.

At least one groove 44 and preferably two diametrally opposed grooves 44 extending parallel to the axis 22 are formed in the rear bore 40. A pin 48 extending through the free end 45 of the rear extension 38 of control rod 16, at right angles to the axis 22, projects across this extension 38 so as to engage each groove 44 and thus prevent any untimely rotation of this rod 16 about the axis 22.

When the operator depresses the trigger 5, the piston 8 is moved backwards, thus driving the control rod 16 and subsequently the adjustment rod 11 associated therewith in the same direction. Thus, the conduits 12, 13 supplying fluid to the bore 15 are opened and the fluids can mix up in said bore 15 and be dispensed under pressure through the nozzle 25. When the trigger 5 is released, the adjustment rod 11 covers both conduits 12, 13 and drives the excess mixture out from the bore 15.

If the conduits 12, 13 delivering the fluids to the mixing chamber 4 or the conduits 36, 37 supplying said fluids to the support 1 are clogged, they can be cleared as follows: the operator removes the top cover 23, releases the screw 27 to free the mixing chamber 4, and the assembly comprising the mixing chamber 4 and the adjustment rod 11 can pivot upwards about the pivot means 14, so that access can be had to conduits 12, 13 and 36, 37, respectively, of mixing chamber 4 and support 1. It is thus possible now to clear these conduits by using a suitable solvent, compressed air, etc. Then the mixing chamber 4 is restored on the free surface 17 of support 1 by pivoting the assembly 4, 11 downwards and tightening the screw 27 in the internally-threaded bore 30. This screw 27 when tightened is advantageously positioned automatically with respect to the support 1 due to the particular configuration of its bearings on support 1, so that it will lock the mixing chamber 4 in the proper angular position about the longitudinal axis 22, the conduits 36, 37 supplying the fluids to said support 1, and the conduits 12, 13 supplying the fluids to the mixing chamber 4 since they are connected to the other conduits 36, 37, respectively. Suitable sealing means 49, 50 preferably fitted in the support 1 are advantageously interposed between the conduits 36, 37 of support 1 and the conduits 12, 13 of chamber 4.

Therefore, the pivot means 14 interconnecting the adjustment rod 11 and the control rod 16 will permit the upward pivotal movement of the assembly comprising the mixing chamber 4 and the adjustment rod 11 at right angles to the free surface 17, said pivot means 14 consists advantageously and preferably of a fork 20 formed at the free end 19 of control rod 16, the slot of this fork 20 extending in a substantially vertical plane (when the gun is held in a vertical position), and holes are formed across the wings of this yoke to permit the passage of a pin 21. The free end 18 of the adjustment rod 11 engages the slot of fork 20 and comprises likewise a transverse hole permitting the passage of the pivot pin 21. To avoid any problem of alignment along the axis of pin 21, these holes (i.e. of fork 20 and/or rod 11) may have a dimension greater than that necessary for their engagement by the pin 21, notably by having an elongated configuration in the vertical direction. Alternatively, or in combination, the means for connecting the mixing chamber 4 to the support 1 are such that they permit the taking up of any misalignment and more particularly said connecting means afford a certain degree of mutual frictional contact between the mixing chamber 4 and the support 1. When the pivot pin 21 is in its operative position, it extends through the holes of fork 20 and of adjustment rod 11, in a substantially horizontal direction. This pivot pin 21 may also be a tight fit, a force fit, or a loose fit in these component elements. Safety means may be provided to prevent any untimely release of pin 21 from fork 20. However, it will be seen that the pin 21 in this horizontal position cannot be removed easily from fork 20. According to this invention, the length of pin 21 will preferably be such that the pin is prevented from escaping from the fork 20 by the substantially vertical walls 46, 47 of the support which are substantially parallel to the axis of rod 11.

When it is desired to disconnect the adjustment rod 11 from the control rod 16, to release the pivot means or joint 14, the operator removes the rear cover 41, thus releasing the pin 48 from grooves 44 and permitting the rotation of control rod 16 about its axis 22. Thus, the pin 21 of joint 14 extends vertically and can be driven out upwardly. To reassemble the joint, the same steps are performed in the reverse order.

In spite of the above-described features, it may happen that the conduits 12, 13, 36, 37 of support 1 and chamber 4 are not exactly in mutual alignment, notably longitudinally, and this condition must be definitely avoided.

Moreover, it was ascertained that an exact axial fit and a perfect alignment of the mixing chamber 4 increase considerably the useful life of this chamber 4, and more particularly the working time without any clogging of the device.

Therefore, according to another feature characterizing this invention, there is provided a device for mixing fluids, notably liquids, and dispensing the mixture thus obtained, which comprises a support 1, a mixing chamber 4 rigidly yet releasably connected to said support 1, at least one movable adjustment member 11 slidably mounted in said mixing chamber 4 for setting the outputs of the fluids fed to said mixing chamber 4 - notably by closing or opening the conduits 12, 13 delivering said fluids to said mixing chamber 14 -, characterized in that said means for rigidly connecting said mixing chamber 4 to said support 1 comprise specific means 51, 52 for aligning and/or wedging said mixing chamber 4 in relation to said support 1 in the axial direction, whereby said mixing chamber 4, when coupled to said support 1, is and remains in a predetermined and accurately defined position with respect to the axis 22 of sliding movement of said adjustment member 11, and/or positively wedged to avoid any possibility of axial play.

Preferably, said specific alignment and axial wedging means 51, 52 consist of respective and complementary configurations imparted to the outer surface 53 of mixing chamber 4 which contacts the support 1 and to the surface 17 of support 1 which constitutes a recess in said mixing chamber 4 and engages the outer surface 53 of this chamber 4. In the form of embodiment illustrated, said specific alignment axial wedging means 51, 52 comprise at least one projection 51 - notably at least one rib 51 projecting from the free surface 17 of support 1 -, engaging at least one groove 52 - notably a recess formed in the outer surface 52 of mixing chamber 4 -. The projection 51 and groove 52 extend in a plane perpendicular to the axis 22 of the sliding movement taking place in the device.

In a modified version of this form of embodiment, or in combination therewith, said specific alignment and/or axial wedging means 51, 52 comprise at least one rib projecting in the mixing chamber 4 and at least one groove formed in the support 1.

The outer surface 53 of mixing chamber 4 is cylindrical or pseudo-cylindrical and the support 1 comprises a surface 17 constituting a hollow recess for receiving said mixing chamber 4, said recess having a shape complementary to that of said outer surface 53, and said specific alignment and/or axial wedging means 51, 52 extend across at least one peripherical portion of the cylindrical or pseudo-cylindrical surfaces 53, 17 in mutual contact.

The projection 51 and groove 52 of said specific aligment and/or axial wedging means have a substantially U-shaped cross-section, the wings of the U diverging outwards from the web 56. Thus, the axial wedging and alignment effects are improved considerably and the projection 51 can be released from the groove 52 without any difficulty, notably during the pivotal movement of chamber 4 about the pivot means 14 of the adjustment rod 11 and control rod 16.

Preferably, the mixing chamber 4 extends in the direction of axial sliding movement of the adjustment member 11, and comprises a central bore 15 in which the adjustment member 11 can slide by penetrating through one end 24 of this bore 15, and a dispensing nozzle 25 consisting of the opposite end of bore 15, and the specific axial alignment and/or wedging means 51, 52 are located in the vicinity of the portion 57 of mixing chamber 4 which is axially opposite said dispensing nozzle 25, as shown in FIGS. 1 and 2.

A flat top face 58 is provided on chamber 4, throughout the length thereof. The upper protection cover 23 extends on the front portion of said flat face 58.

According to a major feature of the invention, said movable adjustment means 11 are guided during their movements in mixing chamber 4 by guide means 59 rigidly connected to and incorporated in said mixing chamber 4, excluding any other guide means in relation to said support 1 and/or said control means 6.

The guide means 59 may consist for instance of a nut screwed to the rear end of the casing 31 of chamber 4, which has formed therein a longitudinal bore 61 slidably engaged by said rod 11 provided at its rear end with an O-ring 60 retained by a washer 62 and a circlip 63.

The mixing chamber 4 comprises a bushing 64 of Teflon ® or like material through which a bore 15 is formed. This bushing 64 is fitted in casing 31 and is otherwise flush with, or juts out, the casing 31, so that the mixture dispensed by the device cannot accumulate in said casing 31 around said nozzle 25 (see FIG. 2).

The mixing chamber 4 comprises means 65 of the packing-box type for resiliently compressing the bushing 64, and the bushing 64 comprises in the vicinity of the nozzle 25 a retaining shoulder 66 co-operating with a ledge 67 of cover 31 for preventing any undesired axial outward movement of said bushing 64 from the casing 31.

Conventionally, the nut of said guide means 59 which engages inner screw-threads of casing 31 is adapted to compress resilient washers and the bushing 64 in casing 31 against said lip 67, so as to constitute a packingbox device.

In a modified form of embodiment (not shown), the specific aligning and/or axial wedging means have a configuration such that they can be disconnected by pivoting the mixing chamber 4 released from support 1 and from the adjustment means 11 about the pin 14 of control means 6. For instance, the projection 51 and groove 52 are curved so as to describe a circular arc centered to said pivot pin 14.

What is claimed as new is:

1. A device for mixing fluids, notably liquids, and dispensing the mixture thus obtained, which comprises support means, a mixing chamber rigidly yet releasably connected to said support means, adjustment rod means sliding in said mixing chamber for adjusting from inside the output of the fluids introduced into said mixing chamber and permitting closing or opening of conduit means supplying said fluids to said mixing chamber, and control means for controlling said adjustment rod means, said control means being rigidly mounted integral with said support means, wherein said adjustment rod means are connected to said control means so as to be movable with respect to said control means but not readily disconnectable with respect to said control means, said adjustment rod means being furthermore independent of said support means, whereby said adjustment rod means can be moved with said mixing chamber in relation to said support means thus permitting access to and cleaning said conduit means without disconnecting said adjustment rod means with respect to said control means.

2. The device of claim 1, which comprises two separate rods, namely an adjustment rod adapted to slide in an internal mixing bore of said mixing chamber and guided during its sliding movements by said mixing chamber to constitute said fluid output adjustment rod means, and a control rod constituting said control means and adapted to slide in relation to said support means and guided during its sliding movements by said support means for controlling said adjustment rod, said adjustment and control rods being movably interconnected with respect to each other but not readily disconnectable from each other.

3. The device of claim 1, wherein the means for interconnecting said adjustment and control means consists of a universal joint, said mixing chamber being associated with a free surface formed externally of said support means so that said mixing chamber can be moved in a direction substantially perpendicular to said free surface when said mixing chamber is disconnected from said support means.

4. The device of claim 2, wherein said adjustment and control rods are pivotally interconnected at their free ends.

5. The device of claim 2, wherein said adjustment and control rods are substantially aligned with each other along a longitudinal axis when said mixing chamber is coupled to said support means and said rods are in their operative positions.

6. The device of claim 2, wherein said adjustment rod projects into said mixing bore through a bore end opposite another bore end constituting a nozzle for dispensing the mixture formed in said mixing chamber, said supply conduit means opening into the inner surface of said mixing bore.

7. A device according to claim 1 for mixing fluids, notably liquids, and dispensing the mixture thus obtained, wherein the means for rigidly yet releasably connecting said mixing chamber to said support means comprise specific means for aligning and axially wedging said mixing chamber with respect to said support means, whereby said mixing chamber, when coupled to said support means, is and remains in a predetermined, accurately defined position in alignment with the axis of sliding movement of said adjustment rod member and wedged without any possibility of axial play.

8. The device of claim 7, wherein said specific alignment and axial wedging means consist of respective and complementary configurations imparted to the outer surface of said mixing chamber which contacts said support means and to the surface of said support means which constitutes a recess receiving said mixing chamber and contacts said outer surface of said mixing chamber.

9. The device of claim 7, wherein said specific alignment and axial wedging means comprise at least one projection engaging at least one groove extending in a plane perpendicular to the axis of the sliding movement of said movable member.

10. The device of claim 9, wherein said specific alignment and axial wedging means comprise at least one rib projecting from said support means and at least one groove formed in the surface of said mixing chamber.

11. The device of claim 9, wherein said specific alignment and axial wedging means comprise at least one projecting rib on said mixing chamber and at least one groove formed in said support and engageable by said rib.

12. The device of claim 8, wherein said outer surface of said mixing chamber is cylindrical substantially, said support means comprising a surface forming a hollow recess engageable by said mixing chamber, said recess having a configuration complementary to that of said outer surface of said mixing chamber, said specific alignment and axial wedging means extending in a transverse plane along at least one peripheral portion of said cylindrical surfaces in mutual contact.

13. The device of claim 9 comprising a projection and a groove of said specific alignment and axial wedging means which, when seen in cross-section, are substantially U-shaped with the wings of the U diverging outwardly from the web thereof.

14. The device of claim 7, wherein said mixing chamber extends in the axial sliding direction of said adjustment member and comprises a central bore in which said adjustment member is adapted to slide by penetrating into a first end of said bore and a dispensing nozzle consisting of the opposite end of said bore, said specific alignment and axial wedging means being located in the vicinity of a portion of said mixing chamber which is axially opposite to said dispensing nozzle.

15. The device of claim 1, wherein said movable adjustment means are guided during their movements in said mixing chamber by guide means coupled to, and incorporated in, said mixing chamber.

16. The device of claim 7 including means enabling said specific means for aligning and axial wedging to be uncoupled by pivoting said mixing chamber disconnected from said support means and from said adjustment means about their pivotal connection with said control means.

17. The device of claim 1, which comprises manual actuating means, notably in the form of a trigger adapted to actuate said control means.

18. The device of claim 17, wherein said support means has the general configuration of a gun so as to be easily handled by the operator.

19. A device for mixing fluids, notably liquids, and dispensing the mixture thus obtained, which comprises support means, a mixing chamber rigidly yet releasably connected to said support means, adjustment rod means sliding in said mixing chamber for adjusting from inside the output of the fluids introduced into said mixing chamber and permitting closing or opening of conduit means supplying said fluids to said mixing chamber, and control means for controlling said adjustment rod means, said control means being rigidly mounted integral with said support means, wherein said adjustment rod means are connected to said control means so as to be movable with respect to said control means but are not readily disconnectable with respect to said control means, said adjustment rod means being furthermore independent of said support means, whereby said adjustment rod means can be moved with said mixing chamber in relation to said support means, thus permitting access to and cleaning said conduit means without disconnecting said adjustment rod means with respect to said control means, wherein the means for interconnecting said adjustment and control means consists of a universal joint, said mixing chamber being associated with a free surface formed externally of said support means so that said mixing chamber can be moved to a position substantially perpendicular to said free surface when said mixing chamber is disconnected from said support means.

20. The device of claim 19, which comprises two separate rods, one rod forming an adjustment rod adapted to slide in an internal mixing bore of said mixing chamber and guided during its sliding movements by said mixing chamber to constitute said fluid output adjustment rod means, and the other rod forming a control rod constituting said control means and guided during its sliding movements by said support means for controlling said adjustment rod, said adjustment and control rods being movably interconnected with respect to each other but not readily disconnectable from each other.

21. A device for mixing fluids, notably liquids, and dispensing the mixture thus obtained, which comprises support means, a mixing chamber rigidly yet releasably connected to said support means, adjustment rod means sliding in said mixing chamber for adjusting the output of the fluids introduced into said mixing chamber and permitting closing or opening of conduit means supplying said fluids to said mixing chamber, and control means for controlling said adjustment rod means, said control means being rigidly mounted integral with said support means, wherein said adjustment rod means are connected to said control means so as to be movable with respect to said control means but not readily disconnectable with respect to said control means, said adjustment rod means being furthermore independent of said support means, whereby said adjustment rod means can be moved with said mixing chamber in relation to said support means, thus permitting access to and cleaning said conduit means without disconnecting said adjustment rod means with respect to said control means, the device comprising two separate rods, namely an adjustment rod adapted to slide in an internal mixing bore of said mixing chamber and guided during its sliding movements by said mixing chamber to constitute said fluid output adjustment rod means, and a control rod constituting said control means and adapted to slide in relation to said support means and guided during its sliding movement by said supports means for controlling said adjustment rod, said adjustment and control rods being movably interconnected with respect to each other but not readily disconnectable from each other, wherein said adjustment and control rods are pivotally interconnected.

22. Apparatus for dispensing foam for packing purposes, which comprise separate tanks for fluid materials, and means for delivering said fluids under pressure to a device for mixing fluids, notably liquids, and dispensing the mixture thus obtained, which comprises support means, a mixing chamber rigidly yet releasably connected to said support means, adjustment rod means sliding in said mixing chamber for adjusting the output of the fluids introduced into said mixing chamber for adjusting from inside the output of the fluids introduced into said mixing chamber and permitting closing or opening of conduit means supplying said fluids to said mixing chamber, and control means for controlling said adjustment rod means, said control means being rigidly mounted integral with said support means, wherein said adjustment rod means are connected to said control means so as to be movable with respect to said control means, said adjustment rod means being furthermore independent of said support means, whereby said adjustment rod means can be moved with said mixing chamber in relation to said support means, thus permitting access to and cleaning said conduit means without disconnecting said adjustment rod means with respect to said control means.

23. The apparatus for dispensing foam as claimed in claim 22, wherein said device for mixing fluids is constituted of a manually actuated device which support means has the general configuration of a gun so as to be easily handled by the operator.

* * * * *